No. 726,184. PATENTED APR. 21, 1903.
J. W. NASH.
FISH MEZZO-RILIEVO.
APPLICATION FILED OCT. 21, 1901.
NO MODEL.
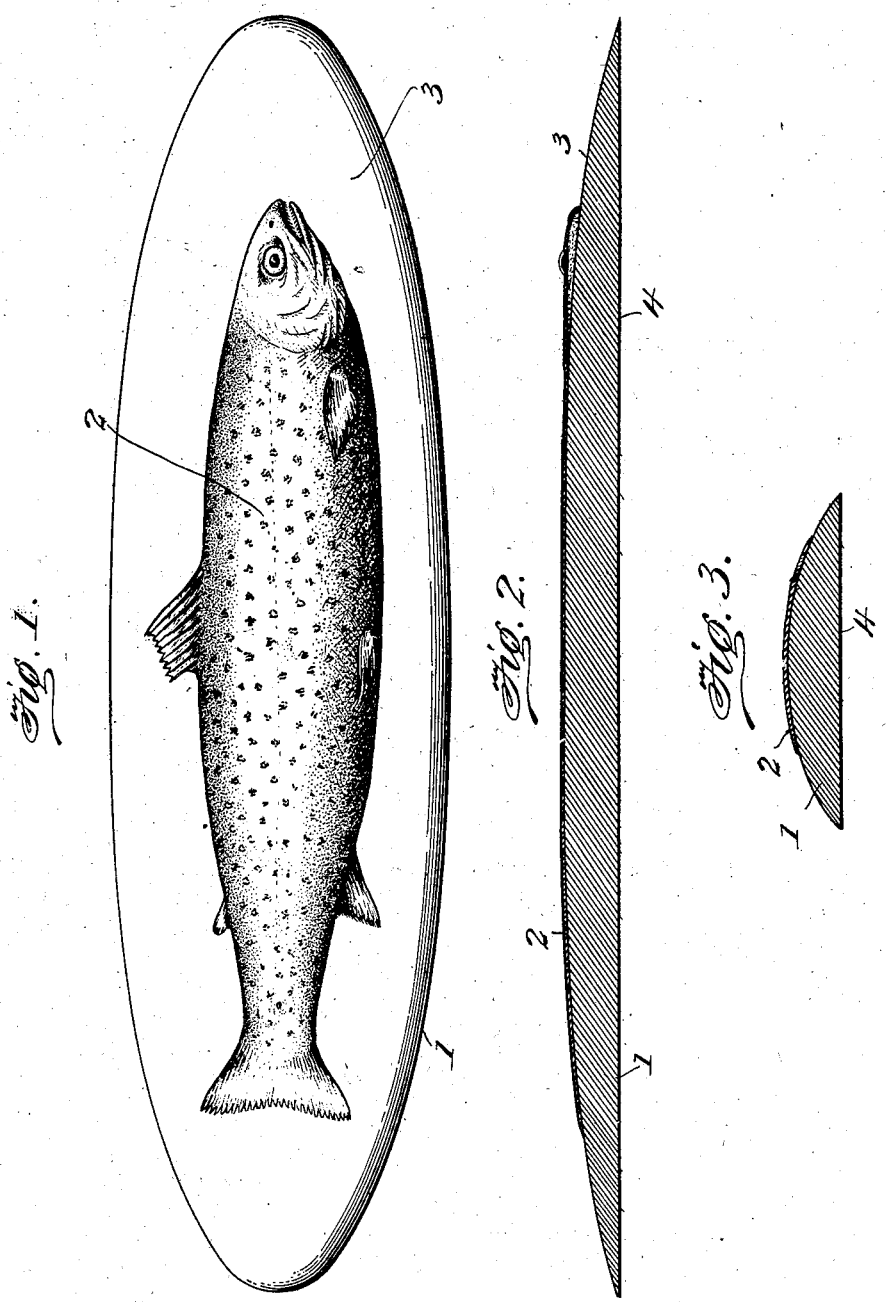

UNITED STATES PATENT OFFICE.

JOHN WALDO NASH, OF NORWAY, MAINE.

FISH MEZZO-RILIEVO.

SPECIFICATION forming part of Letters Patent No. 726,184, dated April 21, 1903.

Application filed October 21, 1901. Serial No. 79,480. (No model.)

*To all whom it may concern:*

Be it known that I, JOHN WALDO NASH, a citizen of the United States, residing at Norway, in the county of Oxford, State of Maine, have invented certain new and useful Improvements in Fish Mezzo-Rilievo, of which the following is a specification.

This invention relates to an improved ornamental mezzo-rilievo panel having a fish-skin mounted thereon.

In the accompanying drawings, Figure 1 is a plan view of a panel embodying the invention. Fig. 2 is a central longitudinal section through the same, and Fig. 3 is a central cross-section.

Referring to the drawings, 1 indicates a panel, preferably made of some hard wood capable of taking a high polish and having a color in contrast with the fish-skin 2, which is mounted upon it, as hereinafter described. The panel, as shown by the cross-section Figs. 2 and 3, is longitudinally and transversely convex upon the outer side 3, plane upon the opposite side 4, and elliptical in outline. The form of the side 4 and the contour of the panel may, however, be varied, if desired.

In preparing the fish-skins for mounting upon the convex surface the fish is split longitudinally along the back, the dorsal fins and tail being, with proper care, also split, thus providing, if desired, two separate complete half-skins from one fish. The fleshy matter is then carefully removed from the skin and the interior of the head, leaving the outer bony structure of the latter, and the skins are then ready for mounting, or one-half of the skin only may be removed for mounting, retaining the tail and median fins complete. In cleaning the skin care is taken not to destroy the pigment upon its inner side. The half-skin thus prepared is then coated upon its inner surface with glue or other adhesive substance and placed upon the elliptical convex surface of the panel, as shown in Fig. 1, the skin smoothed out into its natural form, and the fins and tail being carefully laid out and securely glued in place. The head is slightly raised by inserting beneath it a suitable filling, preferably composed of wood-pulp, glue, and plaster-of-paris, and is then modeled into its natural shape. In order to insure the adhesion of the skin to the wooden panel or base, the skin should be applied to the surface when the latter is in its unfinished state. After the skin has been applied and has become dry the surface of the wood surrounding the skin is filled and polished. Should any of the colors in the skin fade, they may be reproduced and strengthened with oil-colors. With many kinds of fish, however, the natural colors will be preserved. The skin and wood are then coated with a transparent coating of shellac or varnish.

The longitudinally and transversely convex surface of the base or panel upon which the skin is mounted gives to the skin the rounded and natural appearance of a complete fish or a painting of a fish. In each case of course the shape and dimensions and convexity of the base will depend upon the shape and proportions of the fish, and if it is desired to show the fish in an attitude where small portions of its opposite side would appear such portions may be pieced onto the panel in their natural positions.

I am aware that fish-skins have heretofore been mounted; but in prior practice the exact form of the fish has been preserved by stuffing or filling the skin. Fish-skins so mounted have irregular forms which project to a greater extent than skins mounted in accordance with the present invention. They are therefore more liable to injury, and they are objectionable on account of the dust which collects on them. I have discovered that by mounting the fish-skin upon a plain convex surface of regular contour I preserve sufficiently the natural appearance of the fish and produce an article which is artistic and much more durable than mountings having the exact shape of the living fish. The curved surface of the panel is usually larger than the skin to be mounted and of elliptical outline, as shown in the drawings. By the term "surface of regular contour" I mean a surface the cross-sections of which are substantially circular or elliptical lines.

Having described my invention, what I claim, and desire to secure by Letters Patent, is—

1. A fish mezzo-rilievo comprising a panel having a convex surface of regular contour, and a half fish-skin together with the tail, median fins and part of the head, attached to said panel by suitable adhesive material.

2. A fish mezzo-rilievo comprising a panel having a convex surface of regular contour, and a half fish-skin together with the tail, median fins and part of the head, attached to said panel by suitable adhesive material, said panel being elliptical in outline and of greater area than the fish-skin mounted thereon.

In testimony whereof I affix my signature in presence of two witnesses.

JOHN WALDO NASH.

Witnesses:
    EUGENE I. HERRICK,
    RALPH I. TRASK.